May 15, 1934.  V. ZEHENDER  1,958,808
DOUGH AND FLOUR SALVAGER
Filed Feb. 1, 1932  3 Sheets-Sheet 1
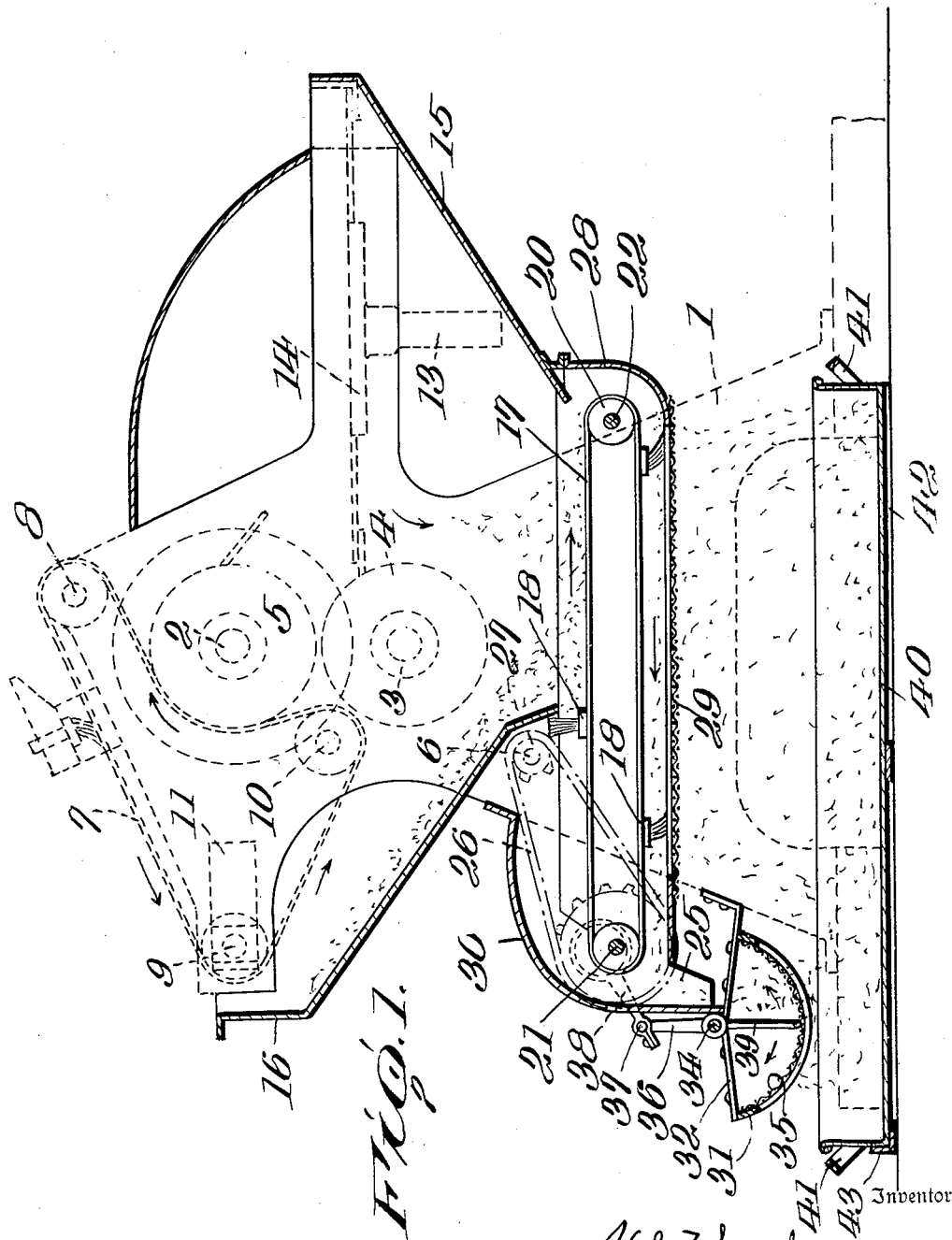

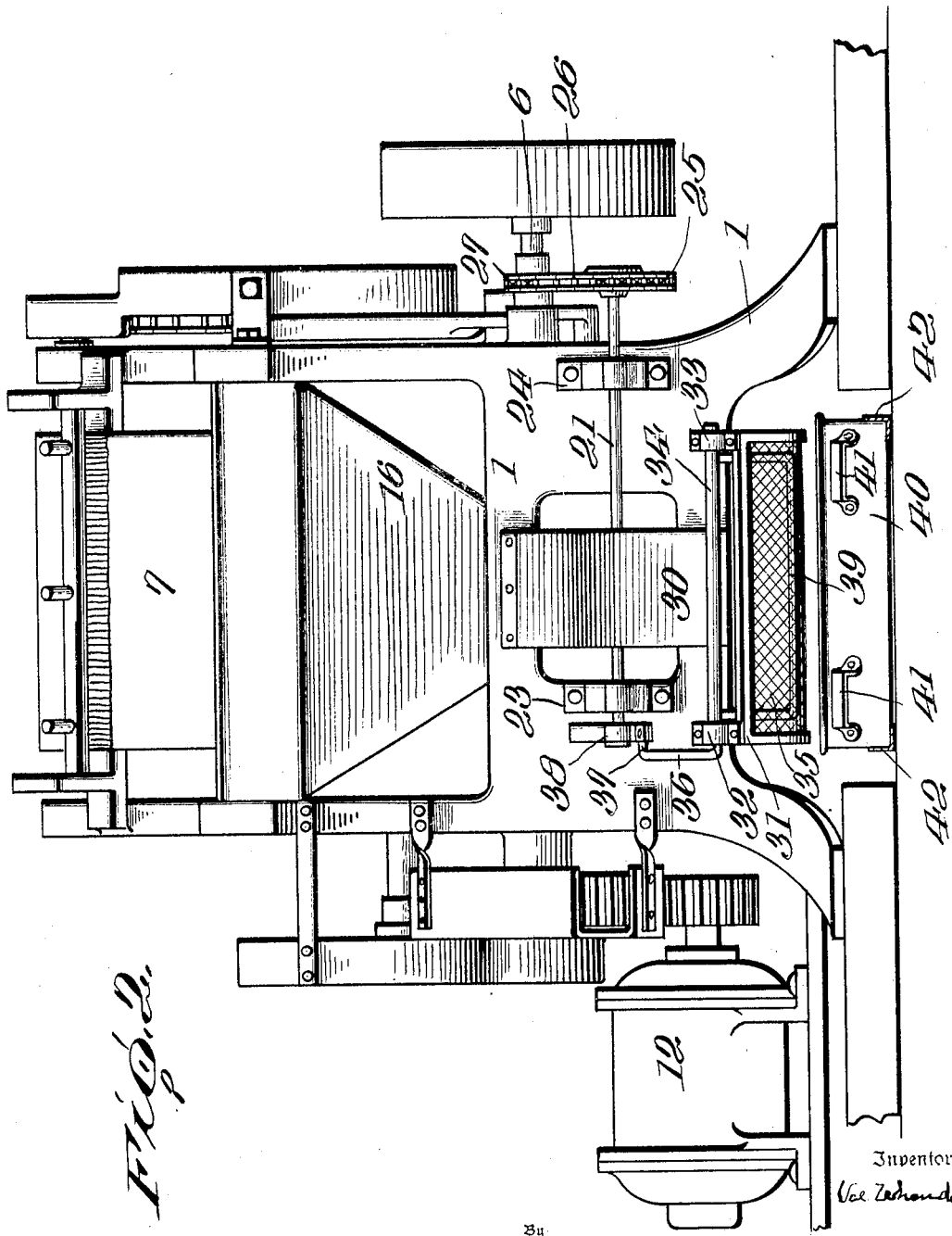

May 15, 1934.  V. ZEHENDER  1,958,808
DOUGH AND FLOUR SALVAGER
Filed Feb. 1, 1932  3 Sheets-Sheet 3
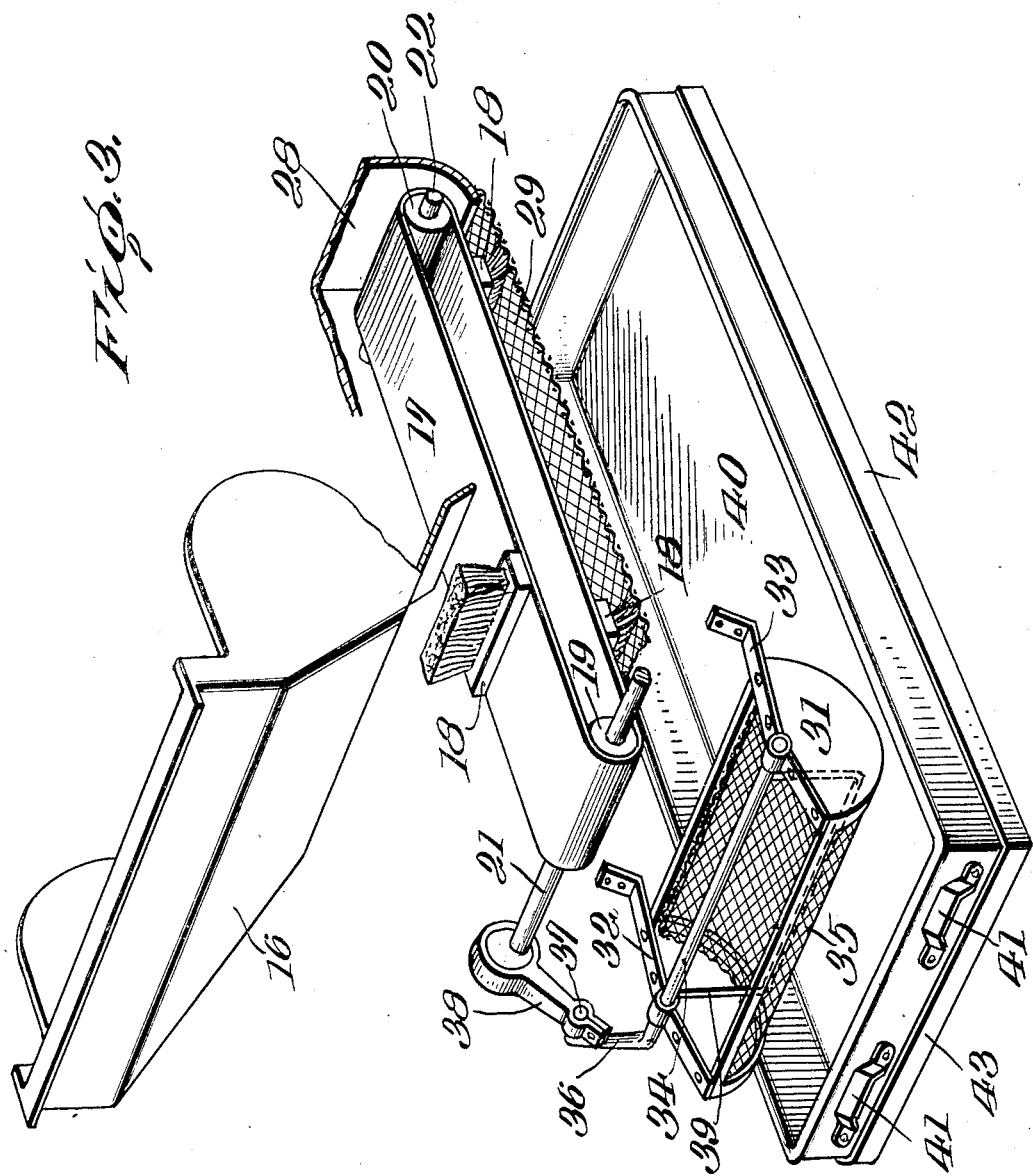
Inventor
Val Zehender
By Sturtevant Mason Porter
Attorneys Patented May 15, 1934

1,958,808

UNITED STATES PATENT OFFICE 1,958,808

DOUGH AND FLOUR SALVAGER

Val Zehender, New Orleans, La.

Application February 1, 1932, Serial No. 590,209

13 Claims. (Cl. 107—7)

The present invention relates to an improved attachment for a dough rolling or sheeting machine. These machines are usually automatic or semi-automatic and are commonly known in the art as dough brakes.

In some of these machines flour is sprinkled on the dough before it is fed to the rollers of the machine; in other machines of the class referred to, the flour is applied directly on the rollers. This application of flour which is to prevent the dough from sticking to the rollers may be done by the operator or by an automatic sprinkler of well known construction. It has been found to be impossible to prevent some of the flour and likewise small pieces of dough which may become disengaged, from escaping between the rollers and so falling to the floor. The flour and dough, after having sifted through the machine to the floor, are unfit for further use because of their unsanitary condition. If, however, these materials are to be used again, it is desirable to separate the flour from the pieces of dough, but this involves additional time and expense. It is clear, therefore, that there has been a great deal of wasted materials and time in the use of dough brakes. The above mentioned waste necessarily involves a corresponding expense which it is desirable to do away with.

It is the principal object of this invention to provide a dough and flour salvager which may be used with any dough brake.

It is a further object of this invention to provide an attachment for a dough brake which will avoid any waste connected with the use of such machines by collecting the ordinarily wasted materials and at the same time rendering said materials completely sanitary whereby they may be used again.

A still further object of this invention is to provide an attachment for dough brakes which will selectively collect the ordinarily wasted flour and dough in separate receptacles and thus save time and expense by rendering these materials fit for immediate use.

This invention further provides an attachment for dough brakes which is entirely automatic in its operation. The attachment is of simple construction and easily attached to any machine of the class described.

These and other objects will in part be obvious and will in part be hereinafter more fully disclosed.

In the drawings which show by way of illustration one embodiment of the invention—

Figure 1 is a side view of so much of a dough brake as is necessary to an understanding of the machine, parts of the same being illustrated in dotted lines and the attachment being shown in section;

Fig. 2 is a rear view of a dough brake illustrating the invention, and

Fig. 3 is a side elevation taken from the opposite side of Fig. 1.

On the frame 1 of any well known dough brake are mounted the shafts 2, 3 which carry the co-acting rollers 4, 5. These rollers are driven by any suitable engaging gears from the main shaft 6. An endless belt 7 travels over roller shafts 8, 9, 10, one of which may be driven from the shaft 2. One of said roller shafts 9 may be adjustably mounted in suitable slots 11 in the frame 1 whereby the tension of the belt 7 is made variable. The main shaft 6 may be driven by a belt connection to any suitable source of power, but in this instance an electric motor 12 is shown directly geared to the said main shaft. A rotating table 14 which is mounted on the vertical shaft 13 may be operated from the main shaft 6 or manually. The belt 7 contacts with the roller 5 so that the dough which is delivered to the rollers 4, 5 is carried up over said roller 5 and returned to the table 14. A further description of the dough brake is deemed unnecessary since the subject of this invention may be attached to any machine of the class described.

Delivery chutes or hoppers 15, 16 are attached to the frame 1 at the front and rear of the dough brake. These chutes are so positioned that they will catch any excess flour or dough which escapes from the machine during its operation. The chutes will then deliver these materials by the action of gravity to an endless conveyer belt 17 which has attached thereto brushes 18 or other suitable scraping devices. The conveyer belt 17 travels over rollers 19, 20 which are mounted on shafts 21, 22 which, in turn, rotate in suitable bearings 23, 24 attached to the frame 1. The shaft 21 is rotated by means of a sprocket wheel 25 keyed thereto which is connected by a chain 26 to a sprocket wheel 27 keyed to the main shaft 6 and through this connection the belt conveyer 17 is driven from said shaft 21.

A housing 28 encloses the sides and one end of the belt conveyer 17. This housing has an opening in its bottom over which is secured a sifting screen 29. An additional housing 30 encloses the other end of the belt conveyer 17 leaving an opening through which materials may be delivered to the sifter frame 31. These housings 28 and 30 enclosing the conveyer belt serve to keep the flour and dough passing therethrough in a perfectly sanitary condition. The sifter frame 31 is secured to the frame 1 by brackets 32, 33 on which are mounted bearings wherein a shaft 34 oscillates. A screen 35 is secured to the under side of said sifter frame 31. The shaft 34 has an angular portion 36 which is pivotally connected at 37 to an arm 38 which is eccentrically mounted on the shaft 21. Thus an oscillating movement is imparted to the shaft 34 and likewise to a scraper 39 attached thereto, and operating over the screen 35 within the sifter frame 31.

A receptacle 40 is placed beneath the machine in such a position as to receive all materials which are delivered from the sifting devices 29 and 35. This receptacle 40 has suitable handle devices 41, which permit it to be removed when so desired. This receptacle 40 rests on suitable base rails 42 to prevent its touching the floor.

The operation is as follows: When the dough brake is operated, the main shaft 6 will rotate the shaft 21 through the chain 26 which travels over the sprocket wheels 25, 27. The rotation of the shaft 21 will operate the belt conveyer 17 in the direction of the arrows. At the same time the oscillating scraper blade 39 will be driven from the shaft 34 which is oscillated by its connection with the arm 38 eccentrically mounted on the shaft 21. A considerable amount of flour which is sprinkled on the dough or co-acting rollers 4, 5 escapes from the machine. Likewise small pieces of dough may become disengaged and so escape. These materials will be directed by the delivery chutes 15, 16 to the belt conveyer 17, which will deposit said materials on the sifter screen 29. The scraping brushes 18, which are attached to the conveyer 17, will then wipe the deposited materials over the screen 29 whereby most of the flour will be sifted through to the receptacle 40. The pieces of dough and the remaining flour will be delivered by said brushes 18 to the sifter frame 31. The oscillating scraper blade 39 will cause a further separation of the flour and dough by causing the remaining flour to sift through the screen 35 to the receptacle 40. The pieces of dough, being unable to pass through the screens 29 and 35, will be collected in the sifter frame 31.

The operator may remove the receptacle 40 whenever it is desirable to use the flour which has been collected therein. He may also remove the pieces of dough which have been collected in the sifter frame 31 when necessary.

From the foregoing description it will be clear that materials ordinarily wasted in the use of dough brakes are by this attachment saved in a perfectly sanitary condition. It is also clear that said materials are separated from each other and collected in separate receptacles whereby they may be immediately used over again.

The attachment is entirely automatic and is operated by the dough brake, but it may be operated by a separate source of power if it is so desired.

Having thus fully described my invention what I claim as new and desire to secure by Letters Patent, is:—

1. A dough brake having the usual table, sheet feeding and reducing rolls and means for driving the same, in combination with an attachment therefor, said attachment including hoppers secured in a position to receive excess materials from said dough brake, a sifting screen below said hoppers, and means located below the delivery ends of said hoppers for receiving and conveying excess materials from said hoppers over and in contact with said sifting screen.

2. A dough brake having the usual table, sheet feeding and reducing rolls and means for driving the same, in combination with an attachment therefor, said attachment including hoppers secured in a position to receive excess materials from said dough brake, and means for selectively collecting excess materials, said means including a sifting screen and a traveling conveyor with scraping devices attached thereto.

3. A dough brake having the usual table sheet feeding and reducing rolls and means for driving the same, in combination with an attachment therefor, said attachment including hoppers secured in a position to receive excess materials from said dough brake, a sifting screen below said hoppers, and means for receiving and conveying excess materials from said hoppers over and in contact with said sifting screen, said means comprising a traveling conveyor with scraping devices attached thereto.

4. A dough brake having the usual table, sheet feeding and reducing rolls and means for driving the same, in combination with an attachment therefor, said attachment including hoppers secured in a position to receive excess materials from said dough brake, means for selectively collecting excess materials, said means including a sifting screen and a traveling conveyor with scraping devices attached thereto, and a receptacle adjacent said sifting screen whereby unsifted materials are deposited therein.

5. A dough brake having the usual table, sheet feeding and reducing rolls and means for driving the same, in combination with an attachment therefor, said attachment including hoppers secured in a position to receive excess materials from said dough brake, a sifting screen below said hoppers, means for receiving and conveying excess materials from said hoppers over and in contact with said sifting screen, and a sifting receptacle adjacent said sifting screen to receive therefrom and further sift the remaining materials of one grade and collect the materials of another grade.

6. A dough brake having the usual table, sheet feeding and reducing rolls and means for driving the same, in combination with an attachment therefor, said attachment including hoppers secured in a position to receive excess materials from said dough brake, a sifting screen below said hoppers, means for receiving and conveying excess materials from said hoppers over and in contact with said sifting screen, and a sifting receptacle adjacent said sifting screen to receive therefrom and further sift the remaining materials of one grade and collect the materials of another grade, said sifting receptacle being provided with a sifting blade having an oscillatory movement imparted thereto through an eccentric connection to the driving shaft of said conveyor.

7. A dough brake having the usual table, sheet feeding and reducing rolls and means for driving the same, in combination with hoppers to receive excess materials from said dough brake, a primary sifting device located below the delivery ends of said hoppers, said primary sifting device including an endless conveyor with scraping devices attached thereto, a sifting screen below said conveyor, means for driving said conveyor whereby the said scraping devices will wipe over and in contact with said sifting screen, a secondary sifting receptacle, and means therein for further sifting the remaining materials, said means including a blade having oscillatory movement imparted thereto through an eccentric connection with the driving shaft of said conveyor whereby the said blade will scrape over the surface of said sifting receptacle.

8. A dough brake having the usual table, sheet feeding and reducing rolls and means for driving the same, in combination with hoppers to receive excess materials from said dough brake, a primary sifting device located below the delivery ends of said hoppers, said primary sifting device including an endless conveyor with scraping devices attached thereto, a sifting screen below said conveyor, means for driving said conveyor whereby the said scraping devices will wipe over and in contact with said sifting screen, a secondary sifting receptacle, means therein for further sifting the remaining materials, said means including a blade having oscillatory movement imparted thereto through an eccentric connection with the driving shaft of said conveyor whereby the said blade will scrape over the surface of said sifting receptacle, and a receptacle located below said primary and said secondary sifting devices to receive therefrom materials of one grade.

9. An attachment for a dough brake including a main and auxiliary receptacle, means including a screen and a conveying device for sifting material of a certain grade to said main receptacle and delivering unsifted materials to said auxiliary receptacle and means associated with said auxiliary receptacle for further sifting material of the same grade into said main receptacle whereby material of another grade is retained in said auxiliary receptacle.

10. A dough brake having the usual table, sheet feeding and reducing rolls and means for driving the same, in combination with an attachment therefor, said attachment including a sifting screen located below said table and said rolls, a conveying device operating over the surface of said screen, an auxiliary receptacle to receive unsifted materials from said screen, means in said auxiliary receptacle to further sift the materials, and a main receptacle below said screen and said auxiliary receptacle to receive materials therefrom.

11. A dough brake having the usual table, sheet feeding and reducing rolls and means for driving the same, in combination with an attachment therefor, said attachment including a movable device located below said table and said rolls, means to deliver excess material falling from said table and said rolls to said device, means for operating said device, and means operative when the device is moved for sifting the excess materials.

12. A dough brake having the usual table, sheet feeding and reducing rolls and means for driving the same, in combination with an attachment therefor, said attachment including a movable receiving device having a screen associated therewith and located below said table and said rolls, hoppers to deliver excess materials falling from said table and said rolls to said device, means for operating said device, and means operative when the device is moved for producing a relative movement between the excess materials and the screen whereby the said materials are sifted and separated.

13. In a dough brake wherein is provided a turntable portion and a belt and roller portion, a waste flour collector associated with the turntable portion, a waste flour collector associated with the belt and roller portion, and means including a sifter and a conveyor for sifting the waste flour and delivering it to a place from which it may be reused, said last named means being common to both collecting means.

VAL ZEHENDER.